2,846,336
METHOD OF INHIBITING THE ADHERENCE OF MOIST MATERIAL TO METAL SURFACES UNDER FREEZING CONDITIONS

Joseph P. Pardo, St. Paul, Minn., assignor to Sta-Vis Oil Company, St. Paul, Minn., a corporation of Minnesota No Drawing. Application February 1, 1954
Serial No. 407,591

6 Claims. (Cl. 117—127)

This invention relates to improvements in compositions for coating metal surfaces and particularly for coating the surfaces of storage, handling and transporting equipment which come in contact with ores and other moist minerals to prevent such materials from adhering to the surfaces of the equipment when freezing temperatures prevail.

Heretofore during the winter months when atmospheric temperatures in mining districts are below freezing much difficulty has been experienced in removing minerals containing substantial amounts of moisture from storage bins, conveyors, trucks, railway cars, hoppers, etc. due to the freezing of the material on the metal surfaces. By the use of my improved coating composition such difficulties may be substantially eliminated.

The present invention has for its principal objects to provide a low cost liquid composition which is characterized by (1) quick surface wetting properties, (2) ability to absorb moisture, (3) effectiveness in extremely low temperature, (4) good coverage, and (5) ease of application.

A further object is to provide a method of inhibiting the adherence of moist material to metal surfaces under freezing conditions by coating the surface with a low cost liquid composition of the character hereinafter described.

With the foregoing objects in view, I provide a composition which comprises essentially a mixture of header acids and dicyclo-toppings in a diluent or carrier mixture selected from the class comprising mineral spirits, naphtha, gasoline and fuel oil distillates of No. 3 grade or lighter. The addition of a suitable alcohol of low molecular weight as a dehydrating agent is also desirable.

The dicyclo-toppings and header acids used in this composition are by-products of the processing of vegetable fatty acids such as tall oil, linseed oil and soy bean oil.

These are coined expressions which are used in the vegetable oil processing industry to identify certain by-products comprising heterogeneous mixtures of such complexity that the chemical composition of neither of them can be given completely or accurately.

"Dicyclo-toppings" identifies a by-product derived from the copolymerization of cyclopentadiene, dicyclopentadiene and linseed oil. The polymerization takes place in a vacuum still at temperatures from 500° to 550° Fahrenheit. Such toppings are the low molecular weight materials, including the cyclopentadiene and dicyclopentadiene plus their inherent impurities, which are thermally distilled and moisture from the reacted pentadienes and linseed oil. It is thought that dicyclo-toppings may contain from 55–70% by weight of cyclopentadiene and dicyclopentadiene with their inherent impurities (C–5 dienes, approximately 6% of the aforementioned percentage made up in a ratio of about 60% piperylene and about 40% isoprene) and may also contain from 30% to 45% polymerized unsaponifiable hydrocarbons, resulting from the reacted linseed oil. A typical inspection of dicyclo-toppings is as follows:

| | |
|---|---|
| Acid number | 30 max. |
| Specific gravity | .890–930. |
| Iodine number | 190–250 max. |
| Flash point | 100° F. minimum. |
| Distillation range | 190° to 300° F. |
| Distillate residue | 30% max. |

Thus the material known as "dicyclo-toppings" is obtained by condensing the lighter fractions of the polymerization process hereinbefore described in condenser coils connected to the vacuum still.

The "header acids" used in my composition are the by-product of the esterification of tall oil and high molecular weight alcohols by means of vacuum distillation. This by-product consists of approximately 21% resin acids, 20–35% of non-oily, unsaponifiable hydrocarbons and the remaining 44–59% consists of oily saponifiable hydrocarbons, resulting from the reaction of the high molecular weight alcohol and the tall oil. Header acids are typically found to have an acid number of 103, an iodine number of 147 and a saponification number of 140. Such header acids and dicyclo-toppings are readily miscible one with the other and both have an affinity for metal and exhibit suitable polarity. The mixture of these reaction products is stable and the proportions of the constituents may be varied between wide limits. A preferred proportion is 3 parts of dicyclo-toppings to 2 parts of header acids, by volume. It has been found that a concentration as low as 10% by volume of this mixture in a suitable petroleum diluent or mixture of diluents is effective to prevent troublesome adherence and freezing of wet ores and like materials on metal surfaces. The following is an example of a preferred composition in proportions by volume:

| | Percent |
|---|---|
| Dicyclo-toppings | 7½ |
| Header acids | 5 |
| Isopropyl alcohol | 4½ |
| Naphtha | 33 |
| No. 1 or No. 2 grade fuel oil | 50 |

In making this product the dicyclo-toppings and header acids are first mixed together to secure good dispersion and then the naphtha is added and thoroughly mixed by agitation. Water derived from the dicyclo-toppings and header acids is then allowed to settle and is drained off. As the next step the alcohol is added and mixed with the previously mixed liquids. Finally, the fuel oil is added and thoroughly blended with the other constituents. This "cutting back" of the more concentrated mixture is preferably done at the mine or other site where the composition is to be used.

Other alcohols of low molecular weight may be substituted for isopropyl alcohol, e. g., ethanol, methanol, butanol or hexanol, or the homologs or isomers of these alcohols. It is also feasible to use a mixture of two or more of such alcohols as a substitute for the isopropyl alcohol, or a mixture of the latter with any of the others named may be used.

By the addition of header acids to the dicyclo-toppings, I eliminate the objectionable odor of such toppings and improve the effectiveness of the composition in minimizing the adherence of wet ores to the metal surfaces of storage, handling and transporting equipment. My improved composition may be readily applied to the surfaces by either spraying or brushing. This composition is an outstanding success by reason of its quick surface wetting properties, ability to absorb moisture, effectiveness at extremely low temperatures, good coverage, and ease of application.

I claim:
1. A method of inhibiting the adherence of moist material to a metal surface under freezing conditions which consists of coating the surface with a mixture of "dicyclo-toppings" and "header acids" containing a substantial proportion of each in at least one diluent selected from the class consisting of mineral spirits, naphtha, gasoline and petroleum fuel oil of not heavier than No. 3 grade.

2. A method in accordance with claim 1 wherein the mixture of "dicyclo-toppings" and "header acids" is in a concentration of not less than 10% by volume.

3. A method of inhibiting the adherence of moist material to a metal surface under freezing conditions, which consists of coating the surface with a mixture of a substantial proportion of "dicyclo-toppings," a substantial proportion of "header acids," an alcohol of low molecular weight and at least one diluent selected from the group consisting of mineral spirits, naphtha, gasoline and a petroleum fuel oil of not heavier than No. 3 grade.

4. A method in accordance with claim 3 wherein the alcohol comprises isopropyl alcohol.

5. A method in accordance with claim 1 wherein said mixture contains approximately three parts of "dicyclo-toppings" to two parts of "header acids" by volume.

6. A method of inhibiting the adherence of moist material to a metal surface under freezing conditions which consists of coating the surface with a mixture of the following ingredients in approximately the following proportions by volume: "dicyclo-toppings" 7½; "header acids" 5%; isopropyl alcohol 4½%, and diluents selected from the group consisting of mineral spirits, naphtha, gasoline and petroleum fuel oils of not heavier than No. 3 grade, 83%.

References Cited in the file of this patent

UNITED STATES PATENTS

| | | |
|---|---|---|
| 2,398,889 | Gerhart | Apr. 23, 1946 |
| 2,573,883 | Waters | Nov. 6, 1951 |
| 2,581,413 | Hillyer | Jan. 8, 1952 |
| 2,598,424 | Peters | May 27, 1952 |
| 2,613,163 | Elliott | Oct. 7, 1952 |
| 2,653,956 | Marhofer et al. | Sept. 29, 1953 |
| 2,659,654 | Tuttle | Nov. 17, 1953 |